Patented June 5, 1951

2,555,762

UNITED STATES PATENT OFFICE 2,555,762

RECOVERY OF STREPTOMYCIN FROM ORANGE II SALT

Peter P. Regna, Woodcliff, N. J., and Isaiah A. Solomons, III, Jackson Heights, and Richard Pasternack, Islip, N. Y., assignors to Chas. Pfizer & Co., Inc., Brooklyn, N. Y., a corporation of New Jersey No Drawing. Application May 15, 1947,
Serial No. 748,336

4 Claims. (Cl. 260—210)

This invention relates to the recovery of streptomycin from streptomycin dye salts, and it has for its object to provide a novel and improved process for this purpose.

Another object of the invention is to provide an efficient and economical method of separating streptomycin of high antibiotic activity from streptomycin dye salts.

Still another object is to separate streptomycin of high antibiotic activity from streptomycin-Orange II salts which may be precipitated directly from crude aqueous solutions of streptomycin, such as fermentation broths.

Various other objects and advantages will be apparent as the nature of the invention is more fully disclosed.

Streptomycin, an antibiotic produced by fermentation from selected strains of cultures of *Streptomyces griseus*, is a highly potent antibacterial agent which is effective against a wide variety of pathogenic organisms. Clinical indications for the use of streptomycin have been observed in urinary tract infections due to gram negative microorganisms, influenza bacillus meningitis, tracheobronchitis and pneumonia, tularemia, ophthalmic infections due to Ps. pyocyaneus, peritonitis due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolite or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

In our copending application, Serial No. 743,206, filed April 22, 1947, we have disclosed that streptomycin is almost quantitatively precipitated from fermentation broths, in the form of a dye salt, by combining the streptomycin in the growth medium with sodium p-(2-hydroxy-1-naphthylazo)-benzene sulfonic acid, a dye which is also known as Orange II (Color Index #151).

Our present invention relates to a method of recovering streptomycin of high antibiotic activity from streptomycin salts of β-naphtholazobenzene-p-sulfonate, and is based upon our discovery of a novel method of accomplishing the metathesis reaction of the said streptomycin dye salt into its two components.

In a preferred embodiment of the invention, this metathesis reaction is carried out by suspending the streptomycin-Orange II in a mixture of equal volumes of 0.1 N sulfuric acid and a solvent, such as butyl alcohol, amyl alcohol, ethers of ethylene glycol ("cellosolves"), phenyl "cellosolve," benzyl "Cellosolve," etc. Since streptomycin is somewhat unstable at this pH (see "Stability of Streptomycin" by Regna, Wasselle and Solomons, J. Biol. Chem. vol. 165, p. 631 (1946)), this procedure should be carried out with expediency. The necessary conditions for carrying out this procedure are (1) that the organic solvent is immiscible with water, (2) that the p-(2-hydroxy-1-naphthylazo)-benzene sulfonic acid is soluble in the organic phase, and (3) that the acidity is maintained such that the streptomycin does not combine with the Orange II in the organic phase. The acidity can be maintained by any organic or inorganic acid which serves to drive the streptomycin salt into the aqueous phase. As a modification, the streptomycin-Orange II dye may be dissolved in a solvent in the absence of dilute acid if solvents such as butanol, benzyl "cellosolve," phenyl "cellosolve," etc., are used, as hereinafter described in Example 4.

The microbiological assays hereinafter referred to were carried out using *Escherichia coli* and *Bacillus subtilis* similar to those employed for penicillin assays. The *B. subtilis* plate assay is carried out by the method of Schmidt and Moyer (J. Bact., vol. 47, p. 199 (1944)), and the *E. coli* turbidimetric assay by the procedure of McMahan (J. Biol. Chem., vol. 153, p. 249 (1944)).

Example 1

Fifty liters of a filtered streptomycin fermentation broth (130 mcg./ml.) was adjusted to pH 5.5 with sulfuric acid and to it was added 70 g. of "supercel" (a diatomaceous earth filter-aid) and 63 g. of Orange II. The large amount of filter aid is not necessary for purposes of aiding the filtration, but is a means of keeping the precipitate well-dispersed in the subsequent conversion of the streptomycin-Orange II salt. The mixture was stirred for one-half hour, filtered and the filtrate, containing 10 mcg./ml., was discarded. The streptomycin-Orange II cake was partially dried on a Buechner funnel and was then divided into a number of portions from which the streptomycin was recovered as described below, as well as in Examples 2 and 4.

Fifty grams of the wet streptomycin-Orange II cake, was suspended in 100 ml. of water and 100 ml. of butyl alcohol, and the mixture was adjusted to pH 1 with dilute sulfuric acid, and shaken. After settling, the aqueous phase and the solids were drawn off. The solids were again suspended in 0.1 N sulfuric acid, and re-extracted with fresh butyl alcohol. The aqueous phase and the solid were again drawn off, the "supercel" was filtered and the aqueous phases were combined. After treating with a very slight amount of declorizing carbon (Darco G-60), the solution was neutralized with barium hydroxide and filtered. The colorless filtrate was frozen, dried under vacuum and further dried in a vacuum desiccator over barium oxide; the dried streptomycin sulfate when assayed against the Food and Drug Administration working standard gave an average potency of 550 mcg./mg. by the B. subtilis agar plate and the E. coli turbidimetric methods.

*Example 2*

Fifty grams of the wet streptomycin-Orange II cake, obtained as described in Example 1, was dissolved in 400 ml. of phenyl "cellosolve." The "supercel" was removed by filtration and the filtrate was extracted with 100 ml. of 0.1 N sulfuric acid. The aqueous phase was drawn off and re-extracted with 50 ml. of phenyl "cellosolve." The aqueous phase was drawn off, neutralized with barium hydroxide and filtered. The filtrate contained 85% of the streptomycin. It was frozen, dried under vacuum and further dried in a vacuum desiccator over barium oxide; the dried streptomycin sulfate when assayed against the Food and Drug Administration working standard gave an average potency of 540 mcg./mg. by the B. subtilis agar plate and the E. coli turbidimetric methods.

*Example 3*

Fifty grams of the wet streptomycin-Orange II cake, obtained as described in Example 1, was suspended in 100 ml. of n-amyl alcohol and 100 ml. of 0.1 N hydrochloric acid. The aqueous phase and the solids were drawn off. The solids were re-suspended in 50 ml. of 0.1 N hydrochloric acid and 50 ml. of fresh n-amyl alcohol. After shaking, the aqueous phase and solids were again drawn off, the "supercel" was filtered, and the combined aqueous extracts were neutralized to pH 6 with silver oxide and filtered. The colorless filtrate was frozen, dried under vacuum and further dried in a vacuum desiccator over barium oxide; the dried streptomycin trihydrochloride when assayed against the Food and Drug Administration working standard gave an average potency of 560 mcg./mg. by the B. subtilis agar plate and the E. coli turbidimetric methods.

*Example 4*

Fifty grams of the wet streptomycin-Orange II cake, obtained as described in Example 1, was suspended in 200 ml. of water-saturated butanol, warmed and filtered. The cake was re-suspended in 75 ml. of fresh water-saturated butanol, warmed and filtered. The butanol layers were combined and extracted once with water. The water layer, which contained less than 2% of the streptomycin and other extraneous materials, was discarded. The butanol layer was again extracted with 100 ml. of 0.1 N sulfuric acid. The aqueous phase was separated and extracted with 25 ml. of water-saturated butanol to remove the last traces of the Orange II dye. The colorless aqueous phase was drawn off, neutralized with barium hydroxide and filtered. The filtrate contained 90% of the streptomycin. It was frozen, dried under vacuum and further dried in a vacuum desiccator over barium oxide; the dried streptomycin sulfate when assayed against the Food and Drug Administration working standard gave an average potency of 550 mcg./mg. by the B. subtilis agar plate and the E. coli turbidimetric methods.

The invention claimed is:

1. A method for preparing a water-soluble streptomycin salt of high antibiotic activity, which comprises subjecting a streptomycin salt of p - (2 - hydroxy - 1 - naphthylazo) - benzene sulfonic acid to metathesis in a liquid mixture of a dilute aqueous inorganic acid of the class consisting of hydrochloric acid and sulfuric acid, and a water-immiscible organic solvent of the class consisting of butyl alcohol, amyl alcohol and the monophenyl and monobenzyl ethers of ethylene glycol, while maintaining the acidity of the mixture within the range at which the streptomycin is relatively stable, thereby extracting the p-(2-hydroxy-1-naphthylazo)-benzene sulfonic acid in the organic phase of said mixture and forming a solution of the desired water-soluble streptomycin salt in its aqueous phase.

2. A method as claimed in claim 1, wherein the pH value of the mixture is maintained in the order of one.

3. A method as claimed in claim 1, wherein the dilute aqueous inorganic acid is sulfuric acid.

4. A method as claimed in claim 1, wherein the water-immiscible, organic solvent is butyl alcohol.

PETER P. REGNA.
ISAIAH A. SOLOMONS, III.
RICHARD PASTERNACK.

REFERENCES CITED

The following references are of record in the file of this patent:

UNITED STATES PATENTS

| Number | Name | Date |
|---|---|---|
| 2,462,175 | Folkers | Feb. 22, 1949 |

OTHER REFERENCES

Perry: "Chemical Engineers' Handbook"; 2nd Ed. (1941) pp. 1214–1215 (2 pages).

Kuehl et al.; Science vol. 102 (1945), pp. 34–35 (2 pages).

Carter et al.; J. Biol. Chem., vol. 160 (1945) page 339 (1 page).

Peck et al.; J. A. C. S., vol. 68 (1946) pp. 29–30 (2 pages).

Kuehl et al.; J. A. C. S., vol. 68 (1946) pp. 1460–1462 (3 pages).